United States Patent [19]

Cox et al.

[11] Patent Number: 5,224,039
[45] Date of Patent: Jun. 29, 1993

[54] METHOD OF ENABLING THE TRANSLATION OF MACHINE READABLE INFORMATION

[75] Inventors: Daryl R. Cox, Bedford; Francis M. Fandrick, Richardson, both of Tex.

[73] Assignee: International Business Machines Corporation, Armonk, N.Y.

[21] Appl. No.: 635,094

[22] Filed: Dec. 28, 1990

[51] Int. Cl.⁵ .............................................. G06F 15/38
[52] U.S. Cl. ................................. 364/419; 395/144; 395/145; 395/148; 395/149
[58] Field of Search ................. 364/419; 395/148, 149, 395/144, 145

[56] References Cited

PUBLICATIONS

Chapman, "National Language Enablement Considerations", IBM Tech. Disc. Bull., vol. 33, No. 7, Dec. 1990, pp. 434–438.

Primary Examiner—Donald E. McElheny, Jr.
Assistant Examiner—Gita Shingala
Attorney, Agent, or Firm—Jonathan E. Jobe, Jr.

[57] ABSTRACT

Disclosed is a method of enabling the translation of machine readable information from a first national language to a second national language. The method includes the steps of forming a table of rules setting forth the number of additional spaces required to contain the second national language translation for a phrase of machine readable information written in the first national language. Then, an appropriate number of additional space is taken from the table is automatically added to each phrase of the machine readable information written in the first national language.

5 Claims, 2 Drawing Sheets

METHOD OF ENABLING THE TRANSLATION OF MACHINE READABLE INFORMATION

BACKGROUND OF THE INVENTION

1. Technical Field

The present invention relates generally to a method of translating machine readable information from one national language to another national language, and more particularly to a method of automatically enabling the translation of machine readable information by automatically adding to each text statement of the machine readable information an appropriate number of spaces required to contain the translation of the text statement.

2. Description of the Related Art

Every year, new markets open outside the United States for computer hardware and software products. Competition and such markets has become fierce. To compete in the increasingly important global markets, it is necessary to be able to transform software written in the United States for use in other countries.

One of the clearest differences between versions of the same product in various countries is seen in the text displayed on the computer display screen. This text, which includes messages, prompts, user keyboard input, help information, menus, and the like, is called machine readable information. The translation of machine readable information from one national language to another is a time consuming and expensive task.

The way machine readable information is packaged can make a big difference in the time and money necessary to implement a national language version of a product. For example, all machine readable information should be separate from any executable code. If the product requires several disks, ideally all of the machine readable information should be on one disk. This allows each country to change and produce only one disk. By isolating the machine readable information from the code, translation and code development can occur simultaneously. Thereby allowing the national language product to get to market more quickly. Isolation also protects the code from being accidentally changed by the translators.

Most languages require more space (length in bytes) than English to communicate the same information. This fact leads to problems in presentation of the machine readable information on the screen. For example, in graphical user interfaces, which consist of a combination of text and graphic information presented on the screen, labels for various graphical objects, such as push buttons and the like, are in fields. When the developer designs the screen, the objects are positioned in an aesthetically pleasing way. When the text labels are translated, there usually is not enough space in the field created by the designer of the graphical interface to contain the translation. Thus, the text is typically truncated. After the translation, the developer must redesign the screen so that the translated machine readable text fits in an aesthetically pleasing manner. Such redesign is fraught with problems, including increased development cycle time and the possible introduction of errors into the code.

Currently, developers leave expansion space in the English text so that they can redesign the screen before the text is translated. Since no language is the longest, the addition of expansion space provides every country with a worst case, which means that after the translation is completed, the developer may need to further tailor the screen. A rule of thumb is that fields of one to ten bytes in length can have one hundred to two hundred percent expansion. For an eight byte field, one developer could leave sixteen bytes and another twenty-four bytes. Most U.S. developers would prefer to leave no expansion space, but in order for their product to be translated they must.

SUMMARY OF THE INVENTION

In the present invention, U.S. developers can develop their machine readable information in English and the proper expansion space is inserted as appropriate for each language. More specifically, in the present invention, a table of rules is formed that sets forth the number of additional spaces required to contain the second national language translation for a phrase machine readable information written in a first national language. Then, an appropriate number of additional spaces taken from the table is automatically added to each phrase of the machine readable information. Thus, the U.S. developer can design his or her screen without regard to translation, thereby saving him or her time and effort. Then, the method of the present invention expands the machine readable information file and the developer can resize the screen appropriately.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
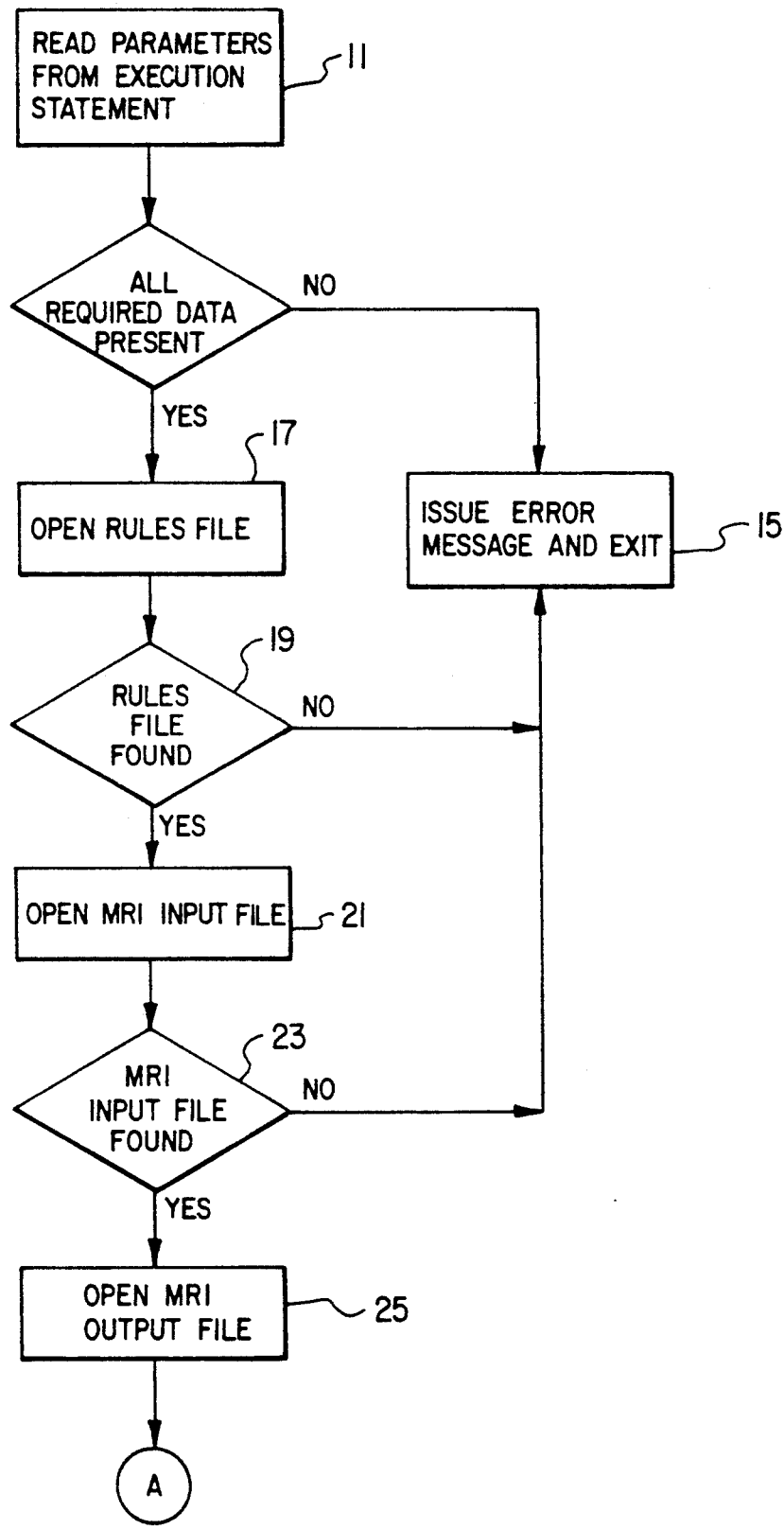
FIG. 1 is a flowchart showing a preferred software implementation of the initialization routine of the method of the present invention.

Referring now to the drawing, and first to FIG. 1, the program is executed with parameters passed as part of the command requesting the execution of the program. The parameters are:

1) Name of the input file.
2) The name of the table containing the rules for the languages.
3) The name of the output file.

Referring to block 11, all parameters are read from the execution statement. As shown at decision block 13, the system determines whether all required data is present. Again, the data must contain the input file name, the rules file name, and the output file name. If the required data is not present, then the system issues and error message and exits at block 15. If all required data are present, then the rules file is opened at block 17 and, at decision block 19, the system tests whether or not the rules file is found. If not, the system issues an error message and exits at block 15. If the rules file is found, then the machine readable information (MRI) input file is opened at block 21 and the system determines, at decision block 23, whether or not the MRI input file is found. If not, then, again, the system issues an error message and exits at block 15. If the MRI input file is found, then the MRI output file is opened at block 25.

Figure 2:
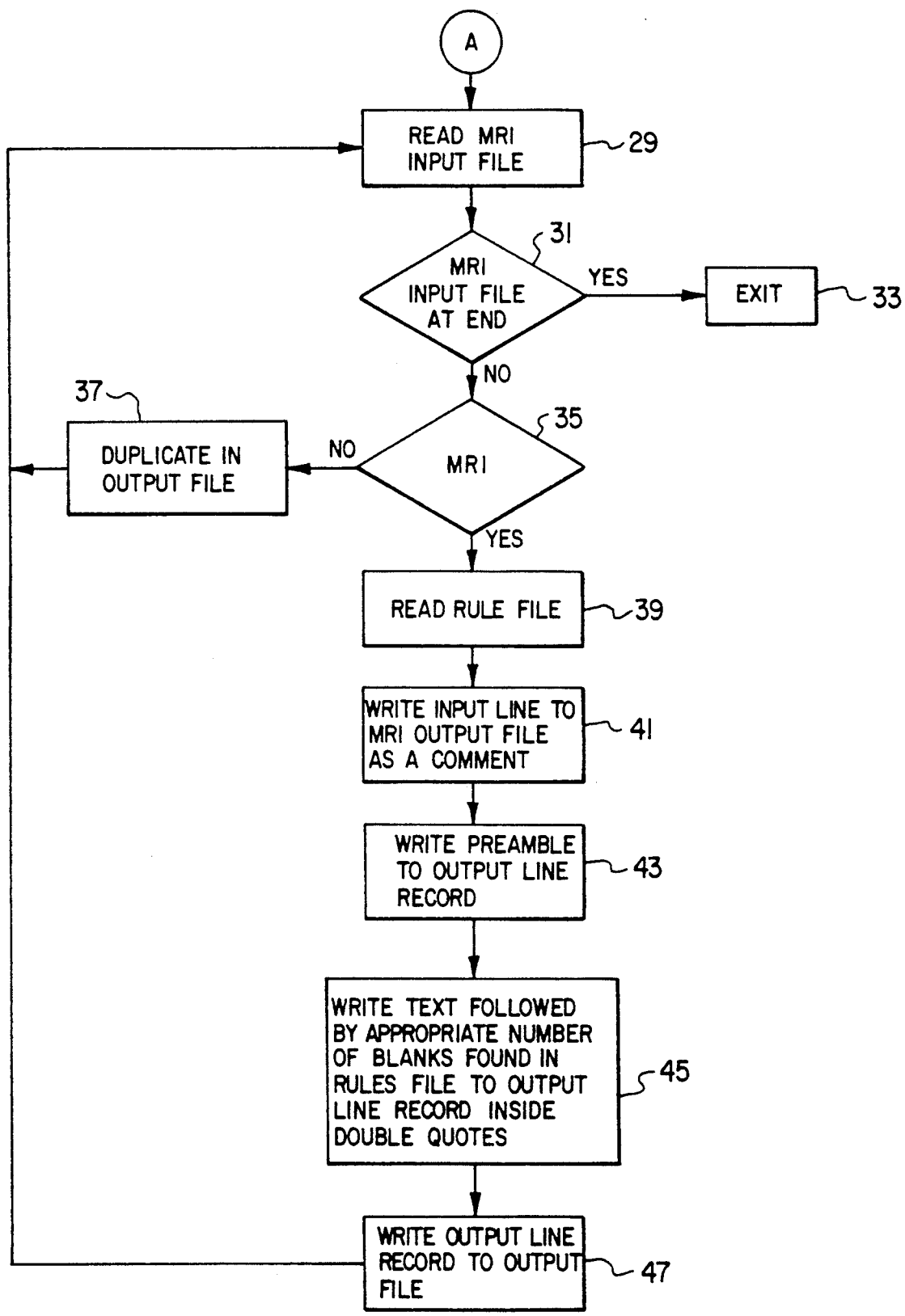
FIG. 2 is a flowchart showing a preferred software implementation of the method of the present invention.

Referring now to FIG. 2, after the system has been initialized, the MRI input file is read one line at a time at block 29. Each line of MRI consists of a preamble and a text statement. The preamble includes a symbolic label for the text statement. In the preferred embodiment, each line of MRI is in the following format:

define LABEL "Text"
-where LABEL is a C programming label, and
-Text is the phrase of the MRI.

In the present invention, "phrase" means one or more words.

The system determines at decision block 31 whether or not the MRI input file is at its end. If it is, all files are closed and the system exits at block 33. If the MRI input file is not its end, the system determines at decision block 35 whether or not the line is MRI. If the line is not translatable, being either a comment or a blank line, the line is written to the output file at block 37 and the system loops back to block 29 to read the next line from the MRI input file. If the MRI input line does contain text, then the rule file is read at block 39.

The rule file is a table of lengths for each language. The table contains different lengths for each length field by language, and it includes columns headed by phrase length values and lines for each language. An example of an English to Danish or Icelandic table is as follows:

| /*Phrase length | <4 | 4 | 5 | 6 | 7 | 8 | 9 | 10 | <21 | <31 | <51 | >50 |
|---|---|---|---|---|---|---|---|---|---|---|---|---|
| /*English (US)*/ | 0. | 0. | 0. | 0. | 0. | 0. | 0 | 0. | 0. | 0. | 0. | 0 |
| /*Danish - */ | 3. | 6. | 5. | 6. | 7. | 8. | 9. | 8. | 10. | 11. | 11. | 11 |
| /*Icelandic */ | 2. | 2. | 3. | 4. | 5. | 6. | 6. | 8. | 10. | 11. | 11. | 11 |

The table is read and indexed to the proper entry using the MRI text length to determine what entry in the table is selected. Then, as shown at block 41, the MRI input line is written to the output file as a comment. It is turned into a comment by inserting "/*" in the first two positions of the line and "*/" at the end of the line. Then, at decision block 43, the preamble of the MRI line, which is the portion beginning with "#define" and ending with the C label is put into an output line record. In the rule file or table, the index number contains the number of blanks that should be inserted after the English text. This number of blanks is inserted after the English text and the entire string is placed in the output line record and enclosed in double quotes at block 45. Finally, the output line record is written to the output line at block 47 and the system loops back to block 29 and reads the next line of the MRI input file. The routine continues in the foregoing fashion until the MRI file is exhausted at decision block 31.

While the invention has been described in a way sufficient to enable one skilled in the art to practice the invention, a better understanding of the invention may be had by reference to the following example of an English language MRI input file enabled according to the present invention for translation into Danish.

| a. Original English MRI file | |
|---|---|
| #define ID_STR1253 | "Title" |
| #define ID_STR1254 | "Title required" |
| #define ID_STR1255 | "Use default text" |
| #define ID_STR1257 | "Text" |
| b. Output file enabled for translation into Danish: | |

| -continued | |
|---|---|
| /*#define ID_STR1253 | "Title"*/ |
| #define ID_STR1253 | "Title_ _ _ _ _" |
| /*#define ID_STR1254 | "Title required"*/ |
| #define ID_STR1254 | "Title required_ _ _ _ _ _ _" |
| /*#define ID_STR1255 | "Use default text"*/ |
| #define ID_STR1255 | "Use default text_ _ _ _ _ _" |
| /*#define ID_STR1257 | "Text"*/ |
| #define ID_STR1257 | "Text_ _ _ _ _ _" |

In the foregoing example, blank spaces are indicated by dashes. The rules table is constructed empirically by observing the amount of expansion space typically needed to translate English language phrases into a different national language.

While the invention has been particularly shown and described with reference to a preferred embodiment, it will be understood by those skilled in the art that various changes in form and detail may be made therein without departing from the spirit and scope of the invention. For example, certain features of the invention may be used independently of other features.

We claim:

1. A method in a computer system of preprocessing machine readable information written in a first national language into a second national language, wherein said machine readable information comprises a plurality of lines including a text statement written in said first national language and a symbolic label for text statement, which comprises the computer implemented steps of:
   a) reading a line of said machine readable information;
   b) writing the symbolic label of said line to an output file;
   c) writing the text statement of said line to said output file;
   d) adding to said text statement in said output file an appropriate number of additional spaces taken from a table of rules setting forth the number of additional spaces required for the second national language translation for a phrase written in said first national language; and,
   e) repeating steps a)-d) until said lines of machine readable information have been preprocessed.

2. The method as claimed in claim 1, including the computer implemented step of:
   writing each line of machine readable information to said output file as a comment.

3. A method in a computer system of preprocessing machine readable information having text statements written in a first national language to enable the translation of said machine readable information into a second national language, which comprises the computer implemented steps of:
   automatically adding to each text statement an appropriate number of spaces taken from a table of rules setting forth the number of additional spaces required for the second national language translation of said text statement.

4. A method in a computer system of preprocessing machine readable information written in a first national language into a second national language, wherein said machine readable information comprises a plurality of lines including a text statement written in said first national language, which comprises the computer implemented steps of:

a) reading a line of said machine readable information;

b) writing the text statement of said line to an output file;

c) Adding to said text statement in said output file an appropriate number of additional spaces taken from a table of rules setting forth the number of additional spaces required for the second national language translation for a phrase written in said first national language; and, d) repeating steps a)-c) until said lines of machine readable information have been preprocessed.

5. The method as claimed in claim 1, including the computer implemented step of:

writing each line of machine readable information to said output file as a comment.

* * * * *